United States Patent [19]

Daio et al.

[11] Patent Number: 5,156,930

[45] Date of Patent: Oct. 20, 1992

[54] BATTERY EQUIPPED WITH OPENING-SEALING DEVICE

[75] Inventors: Fumio Daio, Nara; Masaki Kojima, Kobe, both of Japan

[73] Assignee: Matsushita Electric Industrial Co., Ltd., Osaka, Japan

[21] Appl. No.: 572,551

[22] Filed: Aug. 27, 1990

[30] Foreign Application Priority Data

Aug. 29, 1989 [JP] Japan .................................. 1-221972

[51] Int. Cl.$^5$ ............................................. H01M 2/12
[52] U.S. Cl. ........................................ 429/53; 429/56; 429/174; 429/185
[58] Field of Search .................... 429/53, 56, 174, 185

[56] References Cited

U.S. PATENT DOCUMENTS

| | | |
|---|---|---|
| 3,062,910 | 11/1962 | Schenk . |
| 3,262,819 | 7/1966 | Belove .................... 429/56 |
| 4,345,611 | 8/1982 | Ikeda et al. ............... 429/56 |
| 4,783,383 | 11/1988 | Machida et al. .......... 429/174 |

FOREIGN PATENT DOCUMENTS

| | | |
|---|---|---|
| 53-40433 | 4/1978 | Japan . |
| 59-15398 | 5/1984 | Japan . |

Primary Examiner—William R. Dixon, Jr.
Assistant Examiner—Anthony J. Green
Attorney, Agent, or Firm—Pollock, Vande Sande & Priddy

[57] ABSTRACT

A battery equipped with an opening-sealing device for sealing an opening of a battery case. The opening-sealing device has a dish-like sealing plate having a downwardly protruding portion with a valve through-hole, a valve provided on the dish-like sealing plate so as to cover the valve through-hole, and a terminal cap provided on the valve having a cutter protruded downwardly toward the valve. The valve and terminal cap are firmly held by the dish-like sealing plate with a circumferential portion of the dish-like sealing plate being bent inwardly to the valve and the terminal cap. The valve has a three-layer construction comprising a metallic thin plate, a non-adhesion type resin film, and a heat-adhesion type resin film. The non-adhesion type resin film is provided on one surface of the metallic thin plate so as to face the terminal cap and the heat-adhesion type resin film is provided on the other surface of the metallic thin plate so as to face the dish-like sealing plate and be adhered to the dish-like sealing plate by heating.

17 Claims, 4 Drawing Sheets

BATTERY EQUIPPED WITH OPENING-SEALING DEVICE

BACKGROUND OF THE INVENTION

The present invention relates generally to batteries, and more particularly to opening-sealing devices of organic electrolytic batteries.

Recently, in accordance with considerable progress being made in electronic fields, improvement for primary batteries which are used as power sources for the electronic equipment is being made in terms of size-reduction, weight-reduction, high energy density and high reliability. As one example of primary batteries for the electronic equipment is known an organic electrolytic battery in which a lithium alloy such as lithium and lithium-aluminum (Li-Al) alloy is used as the negative electrode active material, an aprotic nonaqueous electrolyte with a high relative permittivity and a low viscosity is used as the electrolyte, and a graphite fluoride or metallic oxide such as manganese dioxide and copper oxide is used as the positive electrode active material. In the case of operating this primary battery for a long time, the opening-sealing is required to have an extremely high airtightness. If charging is made in the battery due to internal short-circuit or leakage current, gases are generated in the battery and the gas generation provides the possibility that the pressure in the battery abnormally increases to cause explosion of the battery. Thus, in order to prevent the battery explosion, there is provided a battery opening-sealing device with a valve which is constructed by a single metallic thin plate or a composite member comprising a metal plate and a synthetic resin film as disclosed in the Japanese Utility Model Publication No. 59-15398, Japanese Utility Model Provisional Publication No. 53-40433 or U.S. Pat. No. 3062910. Thereafter, as a result of improvement made for this battery opening-sealing device for practical application purposes, there is provided a dish-like opening-sealing plate with a valve which comprises a three-layer lamination film device including a metallic thin film expanded in accordance with increase in the pressure in the battery or broken by the gas pressure in the battery and head-adhesion type resin films provided at both surfaces of the metallic thin film to protect the metallic thin film against the electrolyte and corrosive gases in the atmosphere. The above-described opening-sealing plate is constructed in accordance with the following steps:

1) installing the valve on the inner bottom surface of the opening-sealing plate;

2) mounting a terminal cap (reinforcing plate) on the upper surface of the valve;

3) pressing the circumferential portion of the terminal cap by a jig heated up to above the fusing point of the heat-adhesion type resin film, so that the valve is fixedly heat-adhered to both the circumferential portion of the terminal cap and the inner bottom surface of the dish-like opening-sealing plate;

4) bending a circumferential portion of the dish-like opening-sealing plate inwardly by means of a jig until the circumferential portion thereof is directed to the horizontal directions, thereby fixing the circumferential portion of the terminal cap; and 5) inserting the opening-sealing plate into an annular insulating packing member whose cross section substantially has a L-configuration.

However, according to this machining process, in the step 4), delicate care is necessary in terms of the following points. That is, as illustrated in FIG. 1, the rising portion 1b of the circumference of the dish-like opening-sealing plate 1 is inserted into a jig X having a predetermined inner diameter and a predetermined configuration to reach an arc portion R through a linear portion X1 so as to be bent horizontally to be surely calked with respect to a reinforcing plate 4 as indicated by a dotted line, thereby having a diameter substantially equal to the inner diameter of the jig X and a circumferential configuration corresponding to the shape of the arc portion R of the jig X. Illustrated at character Y is a jig for supporting the dish-like opening-sealing plate 1 and illustrated at character Z is a jig for fixedly pressing and holding the reinforcing plate 4. In this case, since the top portion 1e of the rising portion 1b of the circumference of the dish-like opening-sealing plate 1 has an edge-like configuration, a considerable high frictional force generates at the connecting point between the arc portion R and the linear portion X1 when calking, so that a force F1 is applied to the rising portion 1b so as to be pressed downwardly. This force F1 varies in accordance with the differences of the machining accuracies (dimension error) for the inner diameter of the jig X and the outer diameter of the dish-like opening-sealing plate 1, the machining accuracy of the rising portion 1b and others. This force F1 produces a force F2 which results in the fact that a horizontal portion 1c of the dish-like opening-sealing plate 1 is pressed upwardly, whereby the horizontal portion 1c thereof is deformed so as to form an inclined portion as indicated by a dotted line in FIG. 2. The deformation of the horizontal portion 1c of the dish-like opening-sealing plate 1 causes a load to be applied to the valve 3 and others processed in the previous step 3). In this case, since the valve and reinforcing plate 4 are in the strongly heat-adhered conditions, the load acts so as to separate the valve 3 from the opening-sealing plate portion 1c so as to form a gap as illustrated in FIG. 3. As a result, there is a problem that the formed gap allows the electrolyte in the battery to reach the upper surface of the terminal cap (reinforcing plate 4).

SUMMARY OF THE INVENTION

It is therefore an object of the present invention to provide an opening-sealing device which is capable of eliminating the above-described problem inherent to the conventional opening-sealing device used for batteries.

In accordance with the present invention, there is provided a battery comprising: power-generating means including positive and negative electrodes, an separator and an electrolyte to generate an electrical energy; a housing for encasing therein said power-generating means; and opening-sealing means for sealing an opening of said housing, said opening-sealing means including: dish-like sealing plate means having a downwardly protruding portion provided with a valve through-hole; valve means provided on said dish-like sealing plate so as to cover said valve through-hole; ring-like reinforcing plate means provided on a circumferential portion of said valve means; and terminal cap means provided on said reinforcing plate means and having cutter means protruded downwardly toward said valve means, wherein said valve means and said reinforcing plate means are firmly held by said dish-like sealing plate with a circumferential portion of said dish-like sealing plate means being bent inwardly to said valve means and said reinforcing means, and said valve means has a three-layer construction comprising a metallic thin plate, a non-adhesion type resin film, and a heat-adhesion type resin film, said non-adhesion type resin film being provided on one surface of said metallic thin plate so as to face said reinforcing plate means, and said heat-adhesion type resin film being provided on the other surface of said metallic thin plate so as to face said dish-like sealing plate means and being adhered to said dish-like sealing plate means by heating.

In accordance with the present invention, there is further provided a battery comprising: power-generating means including positive and negative electrodes, a separator and an electrolyte to generate an electrical energy; a housing for encasing therein said power-generating means; and opening-sealing means for sealing an opening of said housing, said opening-sealing means including: dish-like sealing plate means having a downwardly protruding portion provided with a valve through-hole; valve means provided on said dish-like sealing plate so as to cover said valve through-hole; ring-like reinforcing plate means provided on a circumferential portion of said valve means; and current-suppressing means having a ring-like configuration; terminal cap provided on said reinforcing plate means and having cutter means protruded downwardly toward said valve means, wherein said valve means and said reinforcing plate means are firmly held by said dish-like sealing plate with a circumferential portion of said dish-like sealing plate means being bent inwardly to said valve means and said reinforcing means, and said valve means has a three-layer construction comprising a metallic thin plate, a non-adhesion type resin film, and a heat-adhesion type resin film, said non-adhesion type resin film being provided on one surface of said metallic thin plate so as to face said reinforcing plate means, and said heat-adhesion type resin film being provided on the other surface of said metallic thin plate so as to face said dish-like sealing plate means and being adhered to said dish-like sealing plate means by heating, and said current-suppressing means is provided between an upper surface of the bent portion of said dish-like sealing plate means and said terminal cap.

In accordance with the present invention, there is still further provided a battery comprising: power-generating means including positive and negative electrodes, a separator and an electrolyte to generate an electrical energy; a housing for encasing therein said power-generating means; and opening-sealing means for sealing an opening of said housing, said opening-sealing means including: dish-like sealing plate means having a downwardly protruding portion provided with a valve through-hole; valve means provided on said dish-like sealing plate so as to cover said valve through-hole; and terminal cap means provided on said valve means and having cutter means protruded downwardly toward said valve means, wherein said valve means and said terminal cap means are firmly held by said dish-like sealing plate with a circumferential portion of said dish-like sealing plate means being bent inwardly to said valve means and said terminal cap means, and said valve means has a three-layer construction comprising a metallic thin plate, a non-adhesion type resin film, and a heat-adhesion type resin film, said non-adhesion type resin film being provided on one surface of said metallic thin plate so as to face said terminal cap means, and said heat-adhesion type resin film being provided on the other surface of said metallic thin plate so as to face said dish-like sealing plate means and being adhered to said dish-like sealing plate means by heating.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
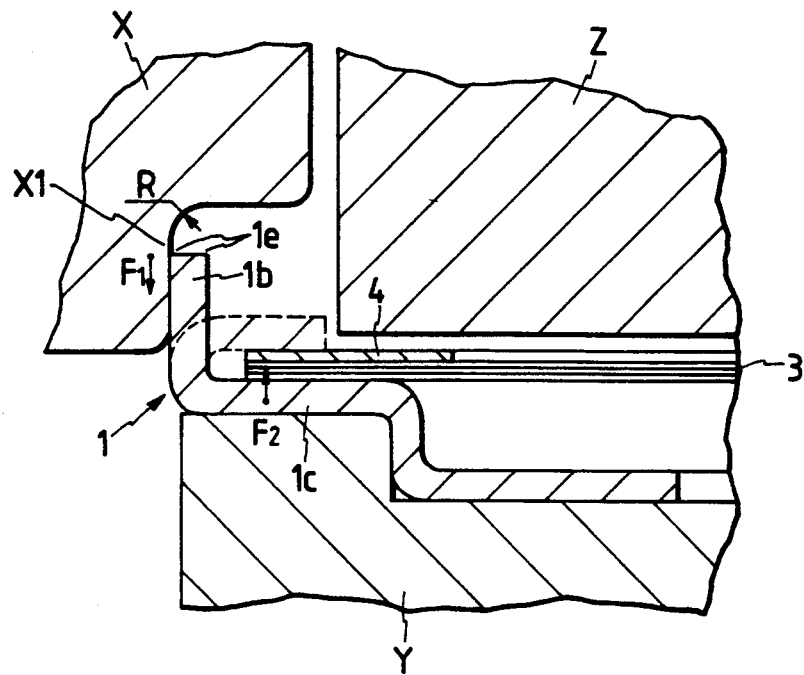
FIGS. 1 to 3 are partially cross-sectional views for describing the arrangement and its problem of a conventional battery opening-sealing device.
Figure 2:
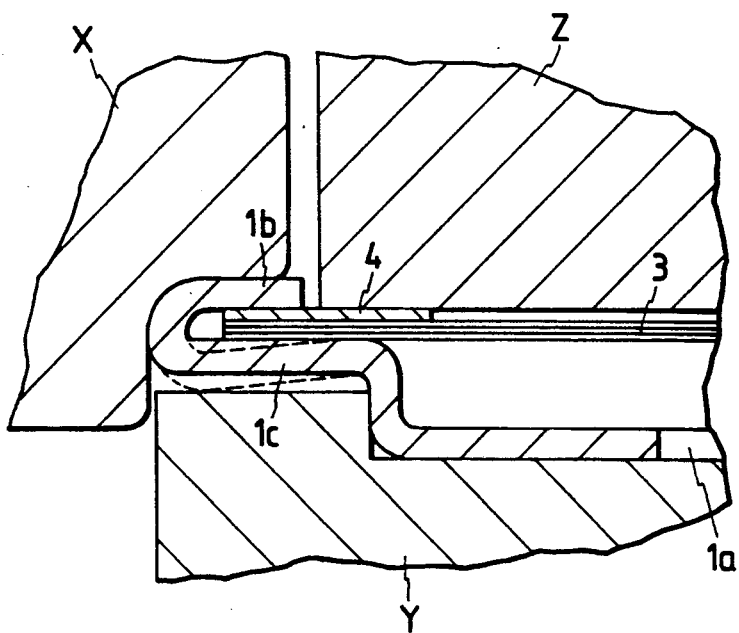
Figure 3:
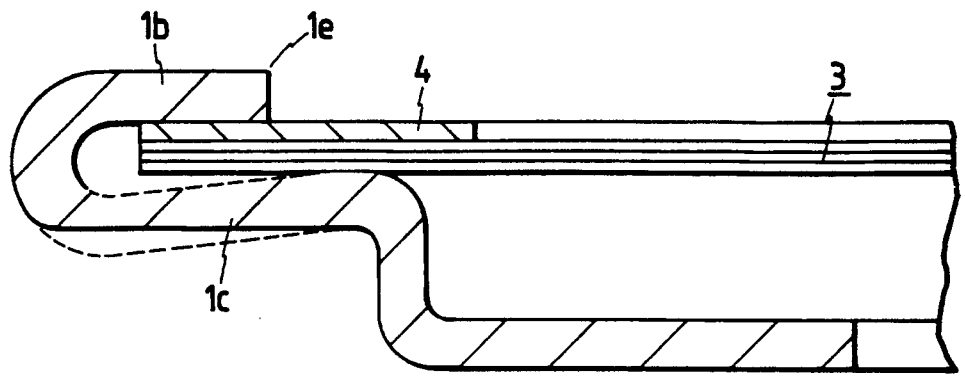
Figure 4:
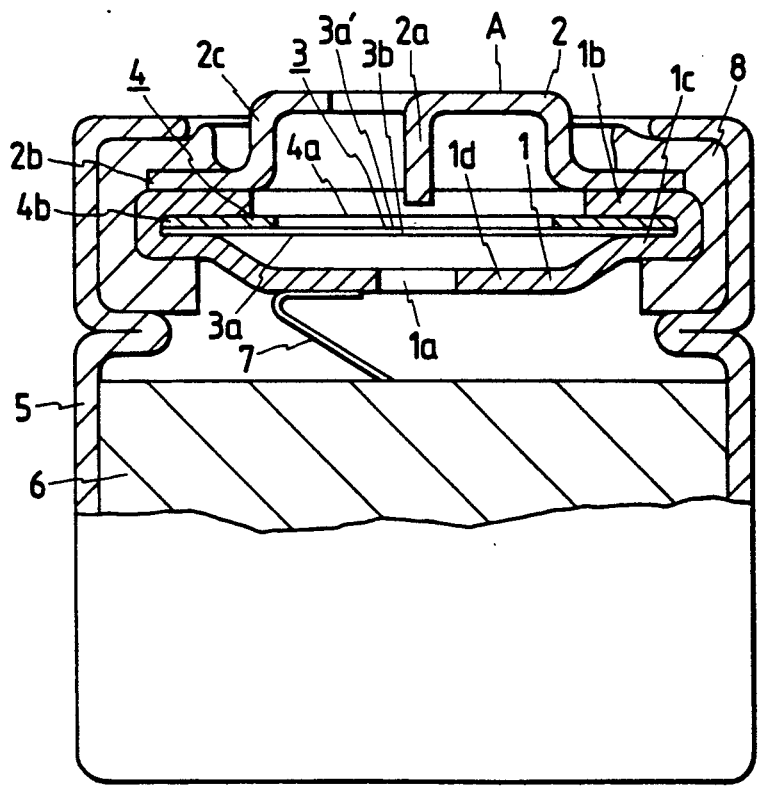
FIG. 4 is a cross-sectional view showing an opening-sealing device of a battery according to a first embodiment of the present invention.

Referring now to FIG. 4, there is illustrated an opening-sealing device with an explosion-proof function according to an embodiment of the present invention which is incorporated into a battery. In FIG. 4, illustrated at character A is the opening-sealing device which is mounted on a battery case 5 having therein a power-generation device 6 comprising positive and negative electrodes and separators provided therebetween. The opening-sealing device A is equipped with a dish-like sealing plate 1 which comprises a horizontal peripheral portion 1c formed horizontally at the periphery of the dish-like sealing plate 1, a bent portion 1b provided at the outer end of the horizontal peripheral portion 1c, and a downwardly protruding portion 1d formed at the center portion of the dish-like sealing plate 1 so as to be downwardly protruded toward the battery case 5 side with respect to the horizontal peripheral portion 1c. At the center portion of the protruding portion 1d is formed a valve through-hole 1a extending from the upper surface to the lower surface of the dish-like sealing plate 1. On the horizontal peripheral portion 1c is mounted a disc-like valve 3 comprising a metallic thin plate 3b and resin films 3a, 3a' provided at both surfaces of the metallic thin plate 3b. On the upper surface of the valve 3 is placed a reinforcing plate 4 having at its center portion a through-hole 4a. The reinforcing plate 4 and the valve 3 are pressed and held to the horizontal peripheral portion 1c by means of the bent portion 1b of the dish-like sealing plate 1 which is bent to be substantially parallel to the horizontal peripheral portion 1c. Thus, the valve 3 acts to always close the valve though-hole 1a formed in the protruding portion 1d of the dish-like sealing plate 1.

The opening-sealing device A is further provided with a terminal cap 2 which is disposed on the upper surface of the bent portion 1b of the dish-like sealing plate 1. The terminal cap 2 comprises an upwardly protruding portion 2c formed at its center portion so as to be protruded upwardly to form an inner space, a cutting portion 2a attached to the lower surface of the upwardly protruding portion 2c to extend downwardly toward the valve 3, and a horizontal flat portion 2b which is directly placed on the upper surface of the bent portion 1b of the dish-like sealing plate 1. Here, the reinforcing plate 4 may be made of a stainless steel (SUS) plate or a corrosion-resisting member such as a nickel plate and an iron plate nickel-plated, which preferably has a thickness of about 0.1 to 0.3 mm. In FIG. 4, numeral 7 represents a conductive lead member through which the positive and negative electrodes are coupled to the opening-sealing device and the battery case 5, and numeral 8 designates an insulating packing provided at the circumferential portion of the opening-sealing device so as to perform insulation between both the electrodes and further to prevent leakage of the electrolyte.

Figure 5:
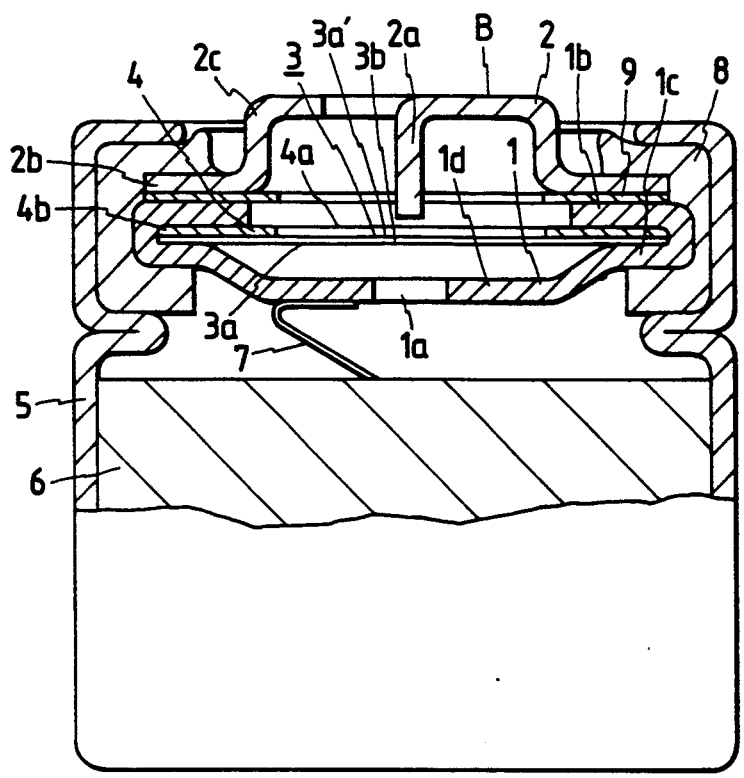
FIG. 5 is a cross-sectional view showing an opening-sealing device of a battery according to a second embodiment of the present invention.

A description will be made hereinbelow in terms of a second embodiment of this invention with reference to FIG. 5, in which parts corresponding to those in FIG. 4 are marked with the same numerals and the description thereof will be omitted for brevity. In FIG. 5, an opening-sealing device according to this embodiment is illustrated at character B. One difference of the FIG. 5 embodiment from the FIG. 4 embodiment is that the opening-sealing device B is additionally equipped with a PTC (positive temperature coefficient) device 9 having a ring-like configuration which is provided between the dish-like sealing plate 1 and the terminal cap 2. In the case of generation of an excessive current due to battery trouble, the PTC device rapidly increases its resistance so as to prevent the excessive current from flowing, thereby preventing firing and damage of the battery. The PSR 21436 developed by Ray Chem Corporation (United States of America) may be used as the PTC device 9.

Figure 6:
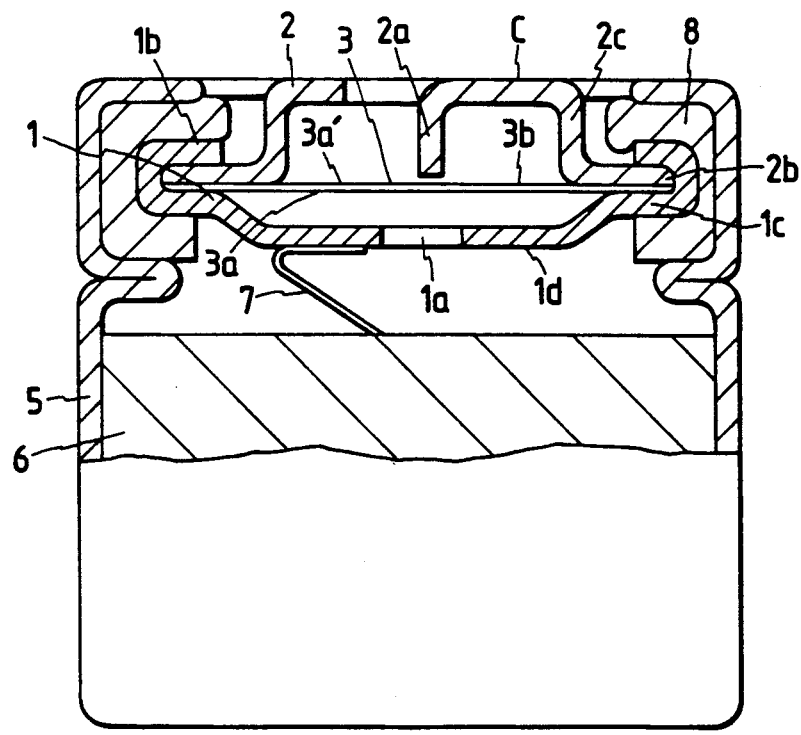
FIG. 6 is a cross-sectional view illustrating an opening-sealing device of a battery according to a third embodiment of this invention.

A third embodiment of this invention will be described hereinbelow with reference to FIG. 6. In FIG. 6, an opening-sealing device of this embodiment is illustrated at character C. One difference between the FIG. 4 embodiment and this embodiment is that the horizontal flat portion 2b, together with the valve 3, is pressed and held by the bent portion 1b of the dish-like sealing plate 1 with respect to the horizontal peripheral portion 1c.

Figure 7:
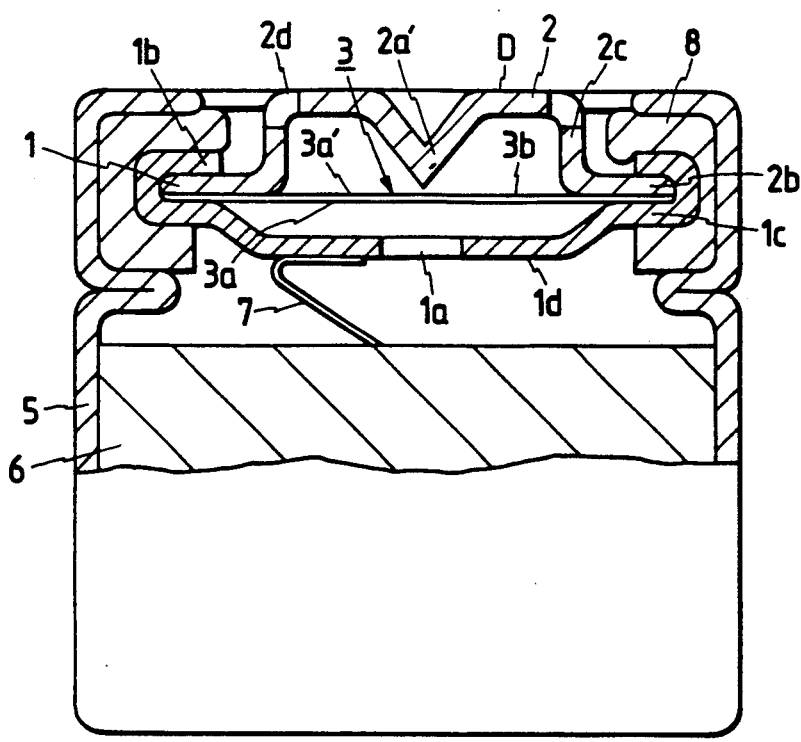
FIG. 7 is a cross-sectional view showing an opening-sealing device according to a fourth embodiment of this invention.

A fourth embodiment of this invention will be described hereinbelow with reference to FIG. 7. In FIG. 7, an opening-sealing device of this embodiment is illustrated at character D. One feature of this embodiment relates to a cutting portion (2a) to be formed at the protruding portion 2c of the terminal cap. In the above-described first to third embodiments the cutting portion 2a is constructed such that the protruding portion 2c is cut greatly and the cut portion is bent downwardly and machined so as to form the cutting portion 2a, thereby forming at the protruding portion 2c a gap portion (defective portion) corresponding to the cutting portion 2a. This gap portion acts as an exhaust hole which discharges gases within the battery in response to operation of the valve 3. Thus, in the case that the battery with this arrangement is directly used without being encased in a case, extraneous substances can easily be inserted into the inside of opening-sealing device through the gap portion. This provides the possibility that the valve 3 is corroded or broken by the extraneous substances. The fourth embodiment is for eliminating this problem. As illustrated in FIG. 7, a cutting portion 2a' corresponding to the cutting portion 2a is constructed such that the protruding portion 2c is compressed or squeezed so as to protrude a portion of the protruding portion 2c downwardly so that the portion thereof has a conical and wedge-like configuration. Further, in this embodiment, exhaust holes 2d are formed at corner portions of the protruding portion 2c, thereby making difficult the insertion of extraneous substances into the opening-sealing device.

Figure 8:
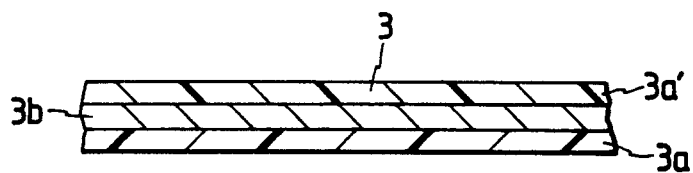
FIG. 8 is a cross-sectional view showing an arrangement of a valve which is used in the first to fourth embodiments of this invention.

A description will be made hereinbelow in terms of the arrangement of the valve 3 with reference to FIG. 8. In FIG. 8, the valve 3 has a three-layer construction and comprises the metallic thin plate 3b made of aluminum and having a thickness of 10 to 30 microns and the resin films 3a and 3a' each having a thickness of 30 to 50 microns and being made of a polyolefin resin such as polyethylene and polypropylene which has an excellent resistance against an organic solvent. With this arrangement, the valve 3 stands against a breaking pressure of 20 to 50 Kg/cm$^2$. At least a portion of the resin film 3a' coming into contact with the reinforcing plate 4 or the terminal cap 2 is made of a non-adhesion type polyolefine resin and at least a portion of the resin film 3a coming into contact with the dish-like sealing plate 1 is made of a heat-adhesion type polyolefine resin. The non-adhesion type resin has a property which does not provide an adhesive effect due to heating and the heat-adhesion type resin has a property that the resin becomes adhesive by heating. For example, the heat-adhesion type resin is made such that unsaturated carboxylic acid having carboxyl group such as maleic acid, methacrylic acid, itaconic acid and fumaric acid is added by 3 to 8% to a non-polar resin such as polyethylene and polypropylene and copolymerization or graft polymerization is performed therefor.

Figure 9:
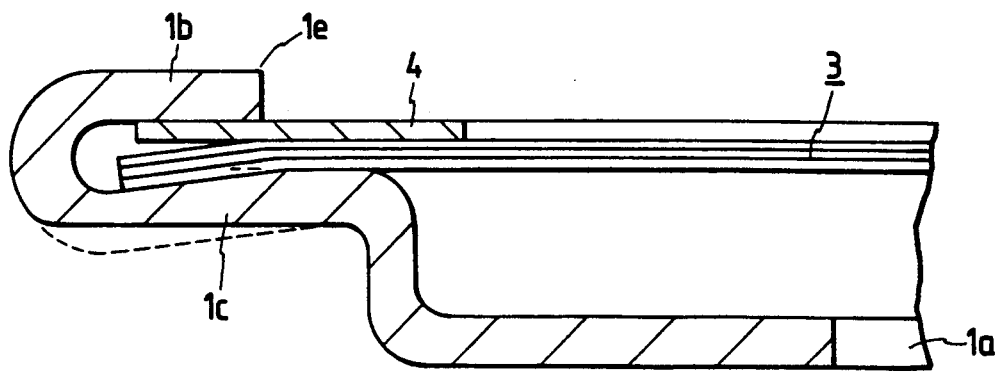
FIG. 9 is an illustration for describing the effect of this invention.

According to the present invention, as illustrated in FIG. 9, even if the horizontal peripheral portion 1c warps due to the bending process, since the valve 3 is in the non-adhesion relation to the reinforcing plate 4 but is in the adhesion relation to the dish-like sealing plate 1, the valve 3 can be kept to contact with the dish-like sealing plate 1 so as to ensure the airtightness of the battery.

A table 1 shows the comparison results in leakage state of the electrolyte on the battery terminals between 100 batteries with the opening-sealing devices according to this invention and 100 batteries with conventional opening-sealing devices under the condition of being kept in the atmosphere whose temperature is 80° C. The numerals in the table 1 represent the numbers of the batteries in which the leakage occurs in accordance with the time passage (number of days). The batteries are manganese-dioxide lithium batteries whose diameter is 17 mm, height is 34 mm and capacity is 1700 mAh. Each of the opening-sealing devices according to this invention includes the valve (3) with a three-layer construction comprising: a metallic thin plate (3b) which is made of aluminum and which has a thickness of 30 microns; a heat-adhesion type polyolefine resin (3a) which has a thickness of 30 microns and which is made of maleic anhydride polyethylene in which polyethylene is graft-polymerized with maleic acid; and a non-adhesion type polyolefine resin (3a') which is made of low-molecular polyethylene and which has a thickness of 30 microns.

TABLE 1

|  | Number of Days | | | |
| --- | --- | --- | --- | --- |
|  | 10 | 30 | 70 | 90 |
| Battery with Sealing Device A | 0 | 0 | 0 | 2 |
| Conventional Battery with Device Compared with Sealing Device A | 12 | 65 | 100 | |
| Battery with Sealing Device B | 0 | 0 | 0 | 1 |
| Conventional Battery with Device Compared with Sealing Device B | 8 | 34 | 75 | 92 |
| Battery with Sealing Device C | 0 | 0 | 0 | 2 |
| Conventional Battery with Device Compared with Sealing Device C | 21 | 68 | 100 | |
| Battery with Sealing Device D | 0 | 0 | 0 | 1 |
| Conventional Battery with Device Compared with Sealing Device D | 13 | 57 | 99 | 100 |

A table 2 shows the adhesion states between the valves and the dish-like sealing plates of 1000 opening-sealing devices found when disassembled after the bending process. The numerals denote the rates of the opening-sealing devices, in which the valve and the dish-like sealing plate are in the perfectly adhered condition, to all of the opening-sealing devices.

TABLE 2

| Sealing Device A | 100% |
| Conventional Sealing Device Compared with A | 2% |
| Sealing Device C | 100% |
| Conventional Sealing Device Compared with C | 3% |

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A battery comprising:
   power-generating means including positive and negative electrodes, a separator and an electrolyte to generate electrical energy;
   a housing for encasing therein said power-generating means; and
   opening-sealing means for sealing an opening of said housing, said opening-sealing means including:
   sealing plate means having a downwardly protruding portion provided with a valve through-hole;
   valve means provided on said sealing plate means to cover said valve through-hole;
   circular reinforcing plate means provided about a circumferential portion of said valve means; and
   terminal cap means provided on said reinforcing plate means and having cutter means protruding downwardly toward said valve means,
   wherein said valve means and said reinforcing plate means are firmly held by said sealing plate means, a circumferential portion of said sealing plate means being bent inwardly to said valve means and said reinforcing plate means, and wherein said valve means has a three-layer construction comprising a metallic thin plate, a non-adhesive resin film, and a heat-adhesive resin film, said non-adhesive resin film being provided on one surface of said metallic thin plate to face said reinforcing plate means, and said heat-adhesive resin film being provided on another surface of said metallic thin plate to face said sealing plate means and to be adhered thereof by heating.

2. A battery as claimed in claim 1, wherein said non-adhesive resin film is made of a polyolefin resin and said heat-adhesive resin film is made of a material which is produced by adding unsaturated carboxylic acid to a polyolefin resin.

3. A battery as claimed in claim 2, wherein said unsaturated carboxylic acid has a carboxyl group and in addition amount of said unsaturated carboxylic acid is 3 to 8 wt %.

4. A battery as claimed in claim 2, wherein said polyolefin resin for said non-adhesive resin film is a polyethylene or polypropylene.

5. A battery as claimed in claim 1, wherein said metallic thin plate of said valve means is made of aluminum.

6. A battery as claimed in claim 1, wherein said reinforcing plate means is made of a stainless steel, nickel or nickel-plated iron plate.

7. A battery comprising:
   power-generating means including positive and negative electrodes, a separator and an electrolyte to generate electrical energy.
   a housing for encasing therein said power-generating means; and
   opening-sealing means for sealing an opening of said housing, said opening-sealing means including:
   sealing plate means having a downwardly protruding portion provided with a valve through-hole;
   valve means provided on said sealing plate means to cover said valve through-hole;
   circular reinforcing plate means provided about a circumferential portion of said valve means;
   terminal cap means provided on said reinforcing plate means and having cutter means protruding downwardly toward said valve means;
   wherein said valve means and said reinforcing plate means are firmly held by said sealing plate means with a circumferential portion of said sealing plate means being bent inwardly to said valve means and said reinforcing plate means, and wherein said valve means has a three-layer construction comprising a metallic thin plate, a non-adhesive resin film, and a heat-adhesive resin film, said non-adhesive resin film being provided on one surface of said metallic thin plate to face said reinforcing plate means, and said heat-adhesive resin film being provided on another surface of said metallic thin plate to face said sealing plate means and be adhered thereto by heating; and
   current-suppressing means having a circular configuration provided between an upper surface of the bent portion of said sealing plate means and said terminal cap.

8. A battery as claimed in claim 7, wherein said non-adhesive resin film is made of a polyolefin resin and said heat-adhesive resin film is made of a material which is produced by adding unsaturated carboxylic acid to a polyolefin resin.

9. A battery as claimed in claim 8, wherein said unsaturated carboxylic acid has a carboxyl group and an addition amount of said unsaturated carboxylic acid is 3 to 8 wt %.

10. A battery as claimed in claim 8, wherein said polyolefin resin for said non-adhesive resin film is a polyethylene or polypropylene.

11. A battery as claimed in claim 7, wherein said metallic thin plate of said valve means is made of aluminum.

12. A battery as claimed in claim 7, wherein said reinforcing plate means is made of a stainless steel, nickel or nickel-plated iron plate.

13. A battery comprising:
power-generating means including positive and negative electrodes, a separator and an electrolyte to generate electrical energy;
a housing for encasing therein said power-generating means; and
opening-sealing means for sealing an opening of said housing, said opening-sealing means including:
sealing plate means having a downwardly protruding portion provided with a valve through-hole;
valve means provided on said sealing plate means to cover said valve through-hole; and
terminal cap means provided on said valve means and having cutter means protruding downwardly toward said valve means;
wherein said valve means and said terminal cap means are firmly held by said sealing plate means with a circumferential portion of said sealing plate means being bent inwardly to said valve means and said terminal cap means, and wherein said valve means has a three-layer construction comprising a metallic thin plate, a non-adhesive resin film, and a heat-adhesive resin film, said non-adhesive resin film being provided on one surface of said metallic thin plate to face said terminal cap means, and said heat-adhesive resin film being provided on another surface of said metallic thin plate to face said sealing plate means and be adhered thereto by heating.

14. A battery as claimed in claim 13, wherein said non-adhesive resin film is made of a polyolefin resin and said heat-adhesive resin film is made of a material which is produced by adding unsaturated carboxylic acid to a polyolefin resin.

15. A battery as claimed in claim 14, wherein said unsaturated carboxylic acid has a carboxyl group and an addition amount of said unsaturated carboxylic acid is 3 to 8 wt %.

16. A battery as claimed in claim 14, wherein said polyolefin resin for said non-adhesive type resin film is a polyethylene or polypropylene.

17. A battery as claimed in claim 13, wherein said metallic thin plate of said valve means is made of aluminum.

* * * * *